UNITED STATES PATENT OFFICE.

GEORGE CLAPHAM, OF HAMILTON, ONTARIO, CANADA.

COMPOSITION OF MATTER FOR THE FINISHING-COAT ON WAINSCOTING, WALLS, AND THE LIKE.

941,498.   Specification of Letters Patent.   Patented Nov. 30, 1909.

No Drawing.   Application filed January 13, 1909.   Serial No. 472,056.

*To all whom it may concern:*

Be it known that I, GEORGE CLAPHAM, a subject of the King of Great Britain, residing at Hamilton, in the county of Wentworth and Province of Ontario, Canada, have invented a new and useful Composition of Matter to be Used for the Finishing-Coat on Wainscoting, Walls, and the Like, of which the following is a specification.

My composition consists of the following ingredients, combined in the proportions stated, namely:

| | |
|---|---|
| Black foundry dust from the tumblers | 23 parts. |
| Plaster of paris | 8 " |
| Portland cement | 5 " |
| Marble dust | 2 2/4 " |
| Dry or lamp black | 1/4 " |
| Retarder | 1 " |
| Lime putty | 50 " |

The first six articles or ingredients are to be thoroughly mingled by agitation.

In using the above named composition, and when the first named six ingredients have been thoroughly mixed together, I then take the last named ingredient, namely, lime putty, adding sufficient water in a cavity formed in the lime putty, then placing the first mentioned mixture in the water, and the whole thoroughly mixed together. The black foundry dust which is full of minute particles of iron and particles of fine sand which adhere to the castings imparts a dark color, and has a hardening effect on the mixture. The black foundry dust, which is first passed through a fine sieve, by its combination with the other ingredients, makes a compact and solid composition when pressed and worked on the wall and enables the finished surface to be given, and to retain, a high polish which will not show dirt, can be easily washed, and is substantially impervious to water. By reason of the presence of the black foundry dust in the composition, when the surface is polished with a trowel or other suitable implement there is obtained varying light and dark shading effects of bluish gray color which are not obtained with any other substance of which I have knowledge. The plaster of paris assists to set the mixture, to allow the work to be finished more quickly. The Portland cement prevents water from penetrating and helps the sanitary effect on the mixture. The marble dust imparts a glittering appearance to the composition, and has a hardening effect. The dry or lamp black gives a dark blue coloring to the composition, and the marble dust gives a bright finish to the same, especially so when the composition has set and hardened on the wall. The retarder is for the purpose of preventing the material from quick setting on the wall, and to allow time for working the material on the wall. The lime putty and water amalgamates all the parts together and imparts a proper working consistency to the mixture and adhering to the wall.

The first mentioned six ingredients may be mixed together for an indefinite period, previous to using, and when the whole, or a portion of said mixture thereof, is required for use, then the second mixture of lime putty and water may be added thereto and thoroughly mixed therewith.

In applying the composition to a wall, after it has been laid on well, it should be gone over with a brush and trowel until the surface is well filled up and a dry troweling should be kept up until there is a good polish.

The present composition will adhere to mortar, hard wall plaster, or Portland cement mortar.

I claim:

1. The herein described composition of matter, consisting of black foundry dust, plaster of paris, Portland cement, marble dust, dry or lamp black, retarder, lime putty and water, substantially as described and for the purpose specified.

2. The herein described composition of matter, consisting of black foundry dust, plaster of paris, Portland cement, dry or lamp black, retarder, lime putty and water, substantially as described and for the purpose specified.

3. A composition consisting of black foundry dust, plaster of paris and lime putty.

4. A composition consisting of black foundry dust, plaster of paris, cement, dry or lamp black and lime putty.

GEORGE CLAPHAM.

Witnesses:
JOHN H. HENDRY,
D. McLAREN.